United States Patent
Ono et al.

(10) Patent No.: US 11,307,662 B2
(45) Date of Patent: Apr. 19, 2022

(54) HAPTIC-FEEDBACK PRESENTING APPARATUS, HAPTIC-FEEDBACK PRESENTING SYSTEM, AND HAPTIC-FEEDBACK PRESENTING METHOD

(71) Applicant: SONY CORPORATION, Tokyo (JP)

(72) Inventors: Akira Ono, Kanagawa (JP); Ryo Yokoyama, Tokyo (JP); Tetsuya Naruse, Kanagawa (JP); Mikio Takenaka, Kanagawa (JP); Ryosuke Murakami, Tokyo (JP); Hideaki Hayashi, Aichi (JP); Mioko Ambe, Tokyo (JP); Ryosuke Takeuchi, Saitama (JP); Kazutoshi Ohno, Kanagawa (JP); Seiji Muramatsu, Saitama (JP); Tetsuya Takahashi, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/914,951

(22) Filed: Jun. 29, 2020

(65) Prior Publication Data
US 2020/0333885 A1 Oct. 22, 2020

Related U.S. Application Data

(63) Continuation of application No. 16/324,472, filed as application No. PCT/JP2017/022508 on Jun. 19, 2017, now Pat. No. 10,739,860.

(30) Foreign Application Priority Data

Aug. 19, 2016 (JP) .............................. JP2016-161028

(51) Int. Cl.
*G06F 3/01* (2006.01)
*G06F 3/041* (2006.01)
(Continued)

(52) U.S. Cl.
CPC .............. *G06F 3/016* (2013.01); *G06F 3/041* (2013.01); *G09B 21/00* (2013.01); *G09B 21/003* (2013.01);
(Continued)

(58) Field of Classification Search
CPC ......... G06F 3/016; G06F 3/041; G09B 21/00; G09B 21/003; G09B 21/006; G09B 29/00; G09B 29/007; G09B 29/10
See application file for complete search history.

(56) References Cited

U.S. PATENT DOCUMENTS

| 8,280,404 | B1 | 10/2012 | Roskind |
| 2002/0111737 | A1* | 8/2002 | Hoisko ................. G01C 21/20 701/526 |

(Continued)

FOREIGN PATENT DOCUMENTS

| JP | 2004-309962 A | 11/2004 |
| JP | 2005-321324 A | 11/2005 |

(Continued)

OTHER PUBLICATIONS

International Search Report and Written Opinion issued in connection with International Patent Application No. PCT/JP2017/022508, dated Aug. 22, 2017. (9 pages).

*Primary Examiner* — Hong Zhou
(74) *Attorney, Agent, or Firm* — K&L Gates LLP

(57) ABSTRACT

An object of the present technology is to provide a haptic-feedback presenting apparatus, a haptic-feedback presenting system, and a haptic-feedback presenting method capable of presenting information mapped in space without vision and audition. A haptic-feedback presenting apparatus according to the present technology includes a mapping-information acquisition part, a region detection part, and a haptic-feedback arithmetic part. The mapping-information acquisition part acquires mapping information that is information
(Continued)

mapped in space. The region detection part sets a detection-target region, and determines whether or not the mapping information included in the detection-target region satisfies a condition, such as being a threshold or more. The haptic-feedback arithmetic part calculates a haptic feedback to be presented to a user on the basis of a determination result from the region detection part.

16 Claims, 8 Drawing Sheets

(51) Int. Cl.
*G09B 21/00* (2006.01)
*G09B 29/00* (2006.01)
*G09B 29/10* (2006.01)

(52) U.S. Cl.
CPC ........... *G09B 21/006* (2013.01); *G09B 29/00* (2013.01); *G09B 29/007* (2013.01); *G09B 29/10* (2013.01)

(56) References Cited

U.S. PATENT DOCUMENTS

| | | | |
|---|---|---|---|
| 2005/0197775 A1* | 9/2005 | Smith | H04W 4/024 |
| | | | 702/3 |
| 2006/0190168 A1* | 8/2006 | Ohnishi | G01C 21/3652 |
| | | | 701/433 |
| 2008/0045156 A1 | 2/2008 | Sakhpara | |
| 2012/0150431 A1* | 6/2012 | Ooka | G01C 21/3652 |
| | | | 701/425 |
| 2012/0310536 A1 | 12/2012 | Katayama et al. | |
| 2013/0306840 A1 | 11/2013 | Kaletsch | |
| 2016/0335876 A1 | 11/2016 | Verma | |
| 2017/0038088 A1 | 2/2017 | Korber et al. | |
| 2017/0092085 A1* | 3/2017 | Agarwal | G06F 3/016 |
| 2017/0097681 A1 | 4/2017 | Ono et al. | |
| 2017/0146358 A1* | 5/2017 | Ward | G01C 21/3652 |

FOREIGN PATENT DOCUMENTS

| | | |
|---|---|---|
| JP | 2011-215929 A | 10/2011 |
| WO | 2014/049399 A1 | 4/2014 |
| WO | 2015/151380 A1 | 10/2015 |

* cited by examiner

HAPTIC-FEEDBACK PRESENTING APPARATUS, HAPTIC-FEEDBACK PRESENTING SYSTEM, AND HAPTIC-FEEDBACK PRESENTING METHOD

CROSS-REFERENCE TO RELATED APPLICATIONS

The present application is a continuation of U.S. application Ser. No. 16/324,472, filed on Feb. 8, 2019, which claims the benefit of International Application No. PCT/JP2017/022508, filed Jun. 19, 2017, which claims priority to Japanese Application No. 2016-161028, filed Aug. 19, 2016, the disclosures of which are incorporated herein by reference.

BACKGROUND

The present technology relates to a haptic-feedback presenting apparatus, a haptic-feedback presenting system, and a haptic-feedback presenting method presenting information to a user by a haptic feedback.

In recent years, instead of information transmission means in the past such as vision and audition, information transmission by a haptic feedback has been developed. For example, in Patent Literature 1, a haptic-feedback transmission apparatus for transmitting a solid object formed in virtual space to a user by the haptic feedback is disclosed.

Moreover, a technology reconstructing a predetermined environment as an object of information transmission has been developed. For example, in Patent Literature 2, an output control technology of environment information extracting characteristics in various environments in a remote place as environment information, and outputting the characteristics to a predetermined space equipment is disclosed.

Technical Problem

In Patent Literature 1, the solid object formed in the virtual space is assumed to have an object shape including a surface texture. Moreover, in Patent Literature 2, an environment technology is an image, sound, a wind direction, a wind speed, or the like. On the other hand, if it is possible that information mapped in space is presented without vision and audition, it will be convenient.

In view of the above-mentioned circumstances, it is an object of the present technology to provide a haptic-feedback presenting apparatus, a haptic-feedback presenting system, and a haptic-feedback presenting method capable of presenting information mapped in space without vision and audition.

Solution to Problem

In order to attain the above-mentioned object, a haptic-feedback presenting apparatus according to an embodiment of the present technology includes a mapping-information acquisition part, a region detection part, and a haptic-feedback arithmetic part.

The mapping-information acquisition part acquires mapping information that is information mapped in space.

The region detection part sets a detection-target region, and determines whether or not the mapping information included in the detection-target region is a threshold or more.

The haptic-feedback arithmetic part calculates a haptic feedback to be presented to a user on the basis of a determination result from the region detection part.

According to the configuration, the haptic-feedback arithmetic part calculates the haptic feedback to be presented to the user depending on the determination result showing whether or not the mapping information included in the detection-target region (for example, scattered pollen count) is the threshold or more. Due to this, the user may grasp by the haptic feedback presented by the haptic-feedback presenting apparatus that the mapping information in the detection-target region is the threshold or more.

The haptic-feedback arithmetic part may present the haptic feedback to the user in a case that the mapping information included in the detection-target region is the threshold or more, and may present no haptic feedback to the user in a case that the mapping information included in the detection-target region is less than the threshold.

According to the configuration, in the case that the mapping information included in the detection-target region is less than the threshold, no haptic feedback is presented to the user. As a result, in a case that the mapping information has a little influence, the user does not have to mind the mapping information.

The haptic-feedback arithmetic part may calculate the present haptic feedback to be presented to the user depending on a difference between the mapping information that is included in the detection-target region and is the threshold or more, and the threshold.

According to the configuration, the haptic feedback (amplitude, frequency, oscillation pattern, or the like) presented to the user is determined by a size of the mapping information, and as a result, the user may grasp the size of the mapping information by the haptic feedback.

The haptic-feedback presenting apparatus may further include a position detection part detecting a position of the haptic-feedback presenting apparatus, and the haptic-feedback arithmetic part may determine a predetermined region, a center of which is the position of the haptic-feedback presenting apparatus, as the detection-target region.

According to the configuration, the detection-target region may be determined as the predetermined region, the center of which is the haptic-feedback presenting apparatus.

The haptic-feedback presenting apparatus may further include an attitude detection part detecting an attitude of the haptic-feedback presenting apparatus, and the haptic-feedback arithmetic part may calculate the haptic feedback to be presented to the user on the basis of the mapping information that is included in the detection-target region and is the threshold or more, and the attitude of the haptic-feedback presenting apparatus.

According to the configuration, a direction of the mapping information with respect to the haptic-feedback presenting apparatus may be calculated from the attitude of the haptic-feedback presenting apparatus, and the haptic feedback depending on the direction of the mapping information may be presented to the user.

The haptic-feedback presenting apparatus may further include a haptic-feedback presenting part producing an oscillation that causes the user to feel that the haptic-feedback presenting apparatus is pulled in a predetermined direction, and the haptic-feedback arithmetic part may determine the predetermined direction on the basis of a direction of the mapping information with respect to the haptic-feedback presenting apparatus and the attitude of the haptic-feedback presenting apparatus in a case that the mapping information included in the detection-target region is the threshold or more.

According to the configuration, the direction of the mapping information that is included in the detection-target region and is the threshold or more may be presented to the user by causing the user to feel (haptic feedback) that the haptic-feedback presenting apparatus is pulled in the predetermined direction.

The haptic-feedback arithmetic part may determine the direction of the mapping information with respect to the haptic-feedback presenting apparatus as the predetermined direction.

According to the configuration, the haptic feedback that the user moves in the direction of the mapping information that is included in the detection-target region and is the threshold or more is presented to the user, and as a result, the user may grasp the direction of the mapping information that is the threshold or more by the haptic feedback.

The haptic-feedback arithmetic part may determine a direction in which the mapping information included in the detection-target region is less than the threshold as the predetermined direction.

According to the configuration, the haptic feedback that the user moves in the direction in which the mapping information is less than the threshold is presented to the user, the user may avoid a direction in which the mapping information is the threshold or more by the haptic feedback.

The mapping information may include first mapping information and second mapping information, and the haptic-feedback arithmetic part may calculate a first haptic feedback as the haptic feedback to be presented to the user in a case that the first mapping information included in the detection-target region is the threshold or more, and may calculate a second haptic feedback as the haptic feedback to be presented to the user in a case that the second mapping information included in the detection-target region is the threshold or more.

According to the configuration, the user may recognize that which of a plurality of types of mapping information (for example, scattered pollen count and ultraviolet-ray amount) is the threshold or more by a type of the haptic feedback.

In order to attain the above-mentioned object, a haptic-feedback presenting system according to an embodiment of the present technology includes a mapping-information acquisition part, a region detection part, and a haptic-feedback arithmetic part.

The mapping-information acquisition part acquires mapping information that is information mapped in space.

The region detection part sets a detection-target region, and determines whether or not the mapping information included in the detection-target region is a threshold or more.

The haptic-feedback arithmetic part calculates a haptic feedback to be presented to a user on the basis of a determination result from the region detection part.

In order to attain the above-mentioned object, in a haptic-feedback presenting method according to an embodiment of the present technology, a mapping-information acquisition part acquires mapping information that is information mapped in space.

In the method, a region detection part sets a detection-target region, and determines whether or not the mapping information included in the detection-target region is a threshold or more.

In the method, a haptic-feedback arithmetic part calculates a haptic feedback to be presented to a user on the basis of a determination result from the region detection part.

Advantageous Effects of Invention

As described above, according to the present technology, a haptic-feedback presenting apparatus, a haptic-feedback presenting system, and a haptic-feedback presenting method capable of presenting information mapped in space without vision and audition may be provided. Note that the effects described above are not limitative, but any effect described in the present disclosure may be produced.

DETAILED DESCRIPTION

Configuration of Haptic-feedback Presenting Apparatus

Figure 1:
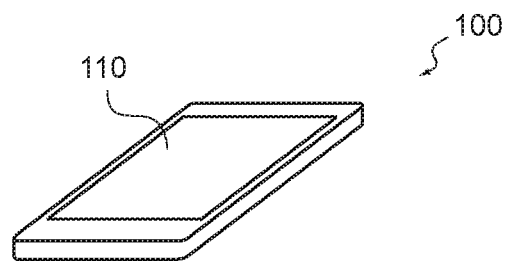
FIG. 1 A perspective view showing a haptic-feedback presenting apparatus according to an embodiment of the present technology.

FIG. 1 is a perspective view showing a haptic-feedback presenting apparatus 100 according to the present embodiment. The haptic-feedback presenting apparatus 100 may be a mobile apparatus such as a smartphone, a tablet PC, or a head mount display capable of realizing a functional configuration described below. Hereinafter, the haptic-feedback presenting apparatus 100 will be a smartphone and be described.

As shown in FIG. 1, the haptic-feedback presenting apparatus 100 includes a display 110. Furthermore, the haptic-feedback presenting apparatus 100 may include a button and the like that are not shown.

Figure 2:
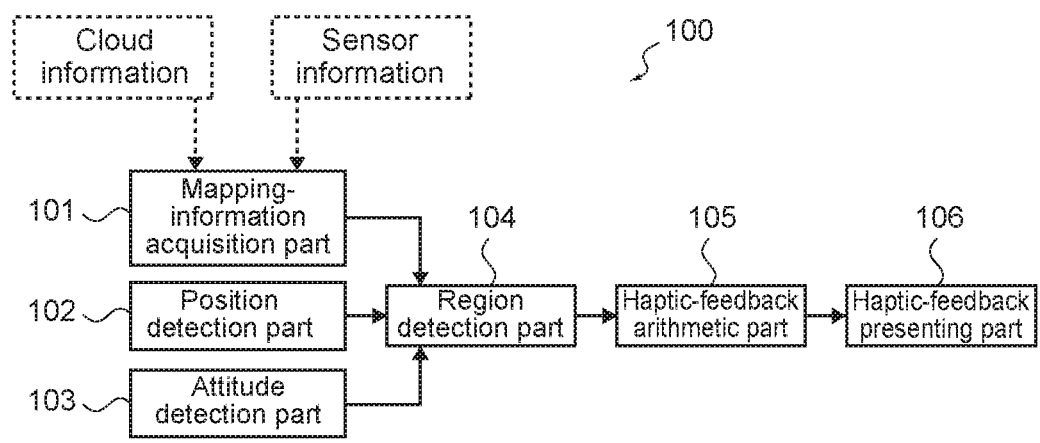
FIG. 2 A block diagram showing a functional configuration of the haptic-feedback presenting apparatus.

FIG. 2 is a block diagram showing the functional configuration of the haptic-feedback presenting apparatus 100. As shown in FIG. 2, the haptic-feedback presenting apparatus 100 includes a mapping-information acquisition part 101, a position detection part 102, an attitude detection part 103, a region detection part 104, a haptic-feedback arithmetic part 105, and a haptic-feedback presenting part 106 as the functional configuration.

Figure 3:
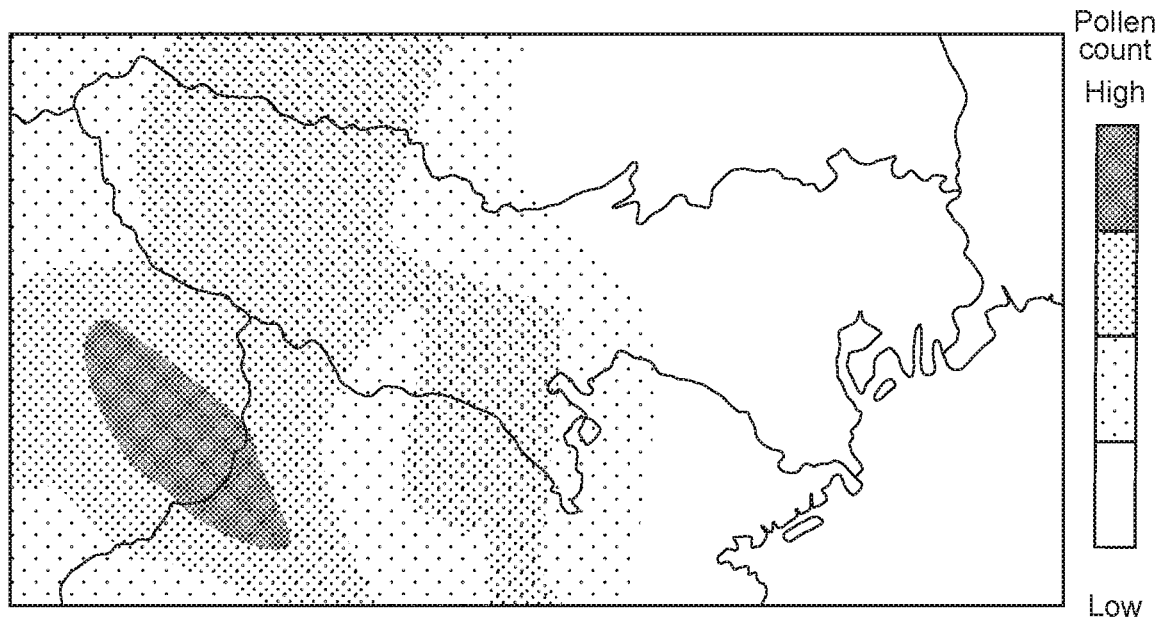
FIG. 3 An example of mapping information acquired by a mapping-information acquisition part included in the haptic-feedback presenting apparatus.

The mapping-information acquisition part 101 acquires mapping information. The mapping information is information related to a particular position in space or on a plane. FIG. 3 is an example of the mapping information, and shows a scattered pollen count on each spot at a specific time point.

Furthermore, examples of the mapping information include a density of an environment such as a radio wave intensity, rain, dust, radioactivity, an ultraviolet ray, an amount of solar radiation, and quantity of airflow, a density of a thing such as congestion in a train and a running position of a train, a density of human such as crowding of human, a place, line of sight, and conversation, a density of a feeling such as an upsurge, exaltation, and a calm, and the like.

As shown in FIG. 2, the mapping-information acquisition part 101 may acquire the mapping information from cloud information via a network, and may acquire the mapping information from an output from a sensor included in the haptic-feedback presenting apparatus 100. Furthermore, the mapping-information acquisition part 101 may also acquire the mapping information by various means. The mapping-information acquisition part 101 supplies the acquired mapping information to the region detection part 104.

The position detection part 102 detects a position of the haptic-feedback presenting apparatus 100. The position detection part 102 may detect the position of the haptic-feedback presenting apparatus 100 by using the GPS (Global Positioning System). Moreover, the position detection part 102 may also detect the position of the haptic-feedback presenting apparatus 100 by using Wi-Fi or the like. The position of the haptic-feedback presenting apparatus 100 may be a three-dimensional coordinate (for example, longitude, latitude, and height), and may also be a two-dimensional coordinate (for example, longitude and latitude). The position detection part 102 supplies the detected position of the haptic-feedback presenting apparatus 100 to the region detection part 104.

The attitude detection part 103 detects an attitude of the haptic-feedback presenting apparatus 100. The attitude detection part 103 may detect the attitude of the haptic-feedback presenting apparatus 100 by using an output from each of a geomagnetic sensor or an acceleration sensor. The attitude detection part 103 supplies the detected attitude of the haptic-feedback presenting apparatus 100 to the region detection part 104.

Figure 4:
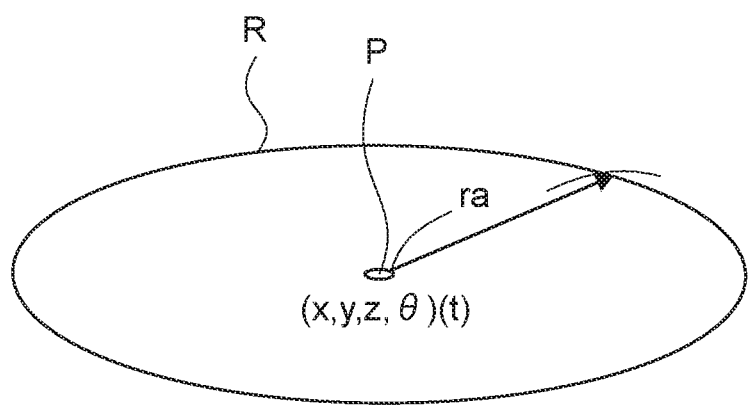
FIG. 4 A diagram schematically showing a detection-target region set by a region detection part included in the haptic-feedback presenting apparatus.

The region detection part 104 sets a detection-target region. FIG. 4 is a diagram schematically showing the detection-target region R. As shown in FIG. 4, the region detection part 104 may determine the inside of a circle having a radius ra, a center of which is the position P of the haptic-feedback presenting apparatus 100, as the detection-target region R. The position and the attitude of the haptic-feedback presenting apparatus 100 at a time point (t) are referred to as the attitude position (x,y,z,θ)(t).

The radius ra is not particularly limited, and a user may set the radius ra. Alternatively, the region detection part 104 may determine the radius ra depending on a type of the mapping information or the like. Moreover, the detection-target region R may not necessarily have a circular shape. Furthermore, the detection-target region R may not be a region in which the haptic-feedback presenting apparatus 100 is a center thereof. Alternatively, the detection-target region R may be a region in which a specific spot appointed by the user or the region detection part 104 is a center thereof.

Figure 5:
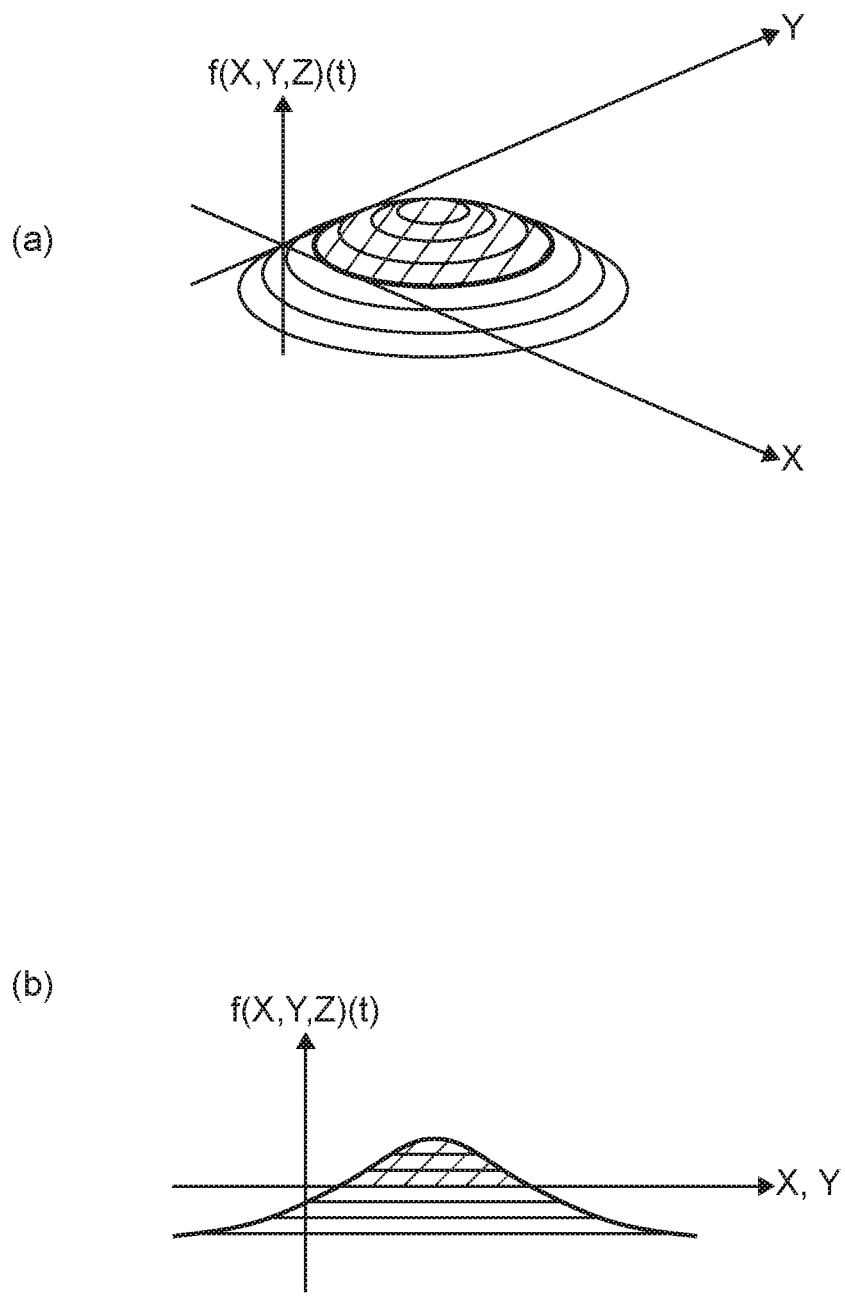
FIG. 5 An example of the mapping information acquired by the mapping-information acquisition part included in the haptic-feedback presenting apparatus.

The region detection part 104 further determines whether or not the mapping information included in the detection-target region R is a threshold or more. FIG. 5 is a diagram schematically showing the f(X,Y,Z)(t), which shows the mapping information on the position (X,Y,Z) at the time point (t).

The threshold is a particular value appointed by the user or a preset particular value. In FIGS. 5(*a*) and (*b*), in a case that the threshold is 0, a region of f(X,Y,Z) (t)≥0 shown by the hatching is a region of the mapping information that is more than the threshold.

Figure 6:
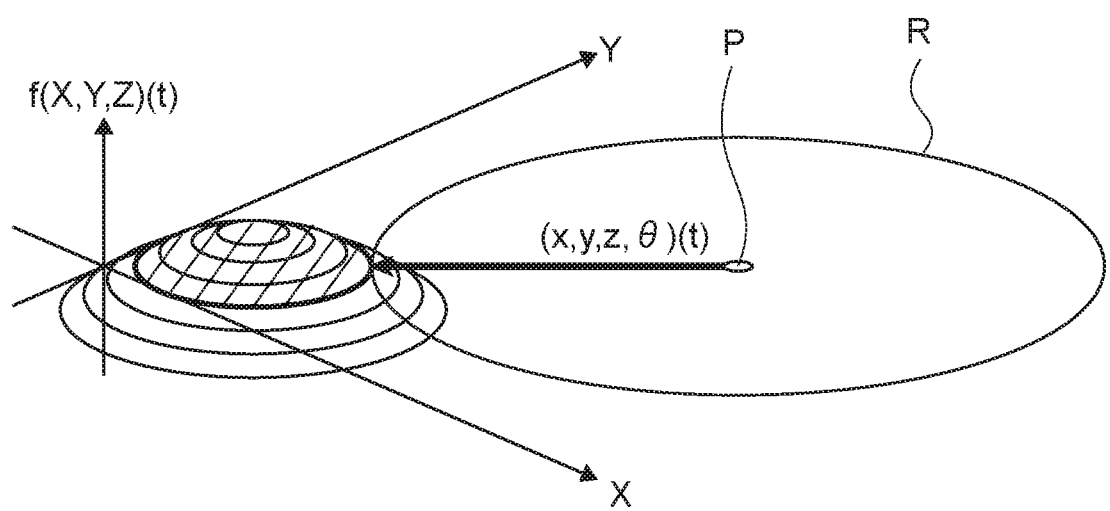
FIG. 6 A diagram schematically showing region detection by the region detection part included in the haptic-feedback presenting apparatus.

FIG. 6 is a diagram schematically showing the detection-target region R and the mapping information. As shown in FIG. 6, the region detection part 104 determines whether or not the mapping information in the detection-target region R is the threshold or more, that is, the mapping information in the detection-target region R satisfies a condition of f(X,Y,Z) (t)≥0. The region detection part 104 supplies a determination result to the haptic-feedback arithmetic part 105.

The haptic-feedback arithmetic part 105 calculates a haptic feedback to be presented to the user on the basis of the determination result from the region detection part 104, and controls the haptic-feedback presenting part 106 to present the calculated haptic feedback.

Specifically, the haptic-feedback arithmetic part 105 presents the haptic feedback to the user in a case that the mapping information included in the detection-target region R is the threshold or more, and is capable of presenting no haptic feedback to the user in a case that the mapping information included in the detection-target region R is less than the threshold.

Moreover, the haptic-feedback arithmetic part 105 may calculate the haptic feedback depending on a size of the mapping information in the detection-target region R or the like. Specifically, the haptic-feedback arithmetic part 105 may intensify the haptic feedback when the mapping information in the detection-target region R is sufficiently more than the threshold, and may weaken the haptic feedback in a case that the mapping information in the detection-target region R is close to the threshold. An intensity of the haptic feedback may be adjusted by an oscillation intensity, an oscillation direction, a frequency, an oscillation pattern, or the like of the haptic-feedback presenting part 106.

The haptic-feedback presenting part 106 presents the haptic feedback calculated by the haptic-feedback arithmetic part 105 to the user. The haptic-feedback presenting part 106 may be a haptic-feedback presenting device (See WO/2015/151380) capable of causing the user to feel (haptic feedback) that the haptic-feedback presenting apparatus 100 is pulled in a particular direction. Moreover, the haptic-feedback presenting part 106 may be an eccentric motor producing an oscillation by rotation or a linear actuator producing an oscillation by translation. Furthermore, the haptic-feedback presenting part 106 may be capable of presenting the haptic feedback to the user.

The haptic-feedback arithmetic part 105 may calculate a direction in which the haptic feedback is presented depending on a direction of the mapping information with respect to the haptic-feedback presenting apparatus 100. As shown by an arrow in FIG. 6, the haptic-feedback arithmetic part 105 may, for example, present the direction of the mapping information that is the threshold or more in the detection-target region R to the user by the haptic feedback. Moreover, the haptic-feedback arithmetic part 105 may present a direction different from the direction of the mapping information that is the threshold or more in the detection-target region R to the user by the haptic feedback on the basis of the direction of the mapping information that is the threshold or more in the detection-target region R. For example, the haptic-feedback arithmetic part 105 may present a direction opposite to the mapping information that is the threshold or more in the detection-target region R to the user.

Operation of Haptic-feedback Presenting Apparatus

Figure 7:
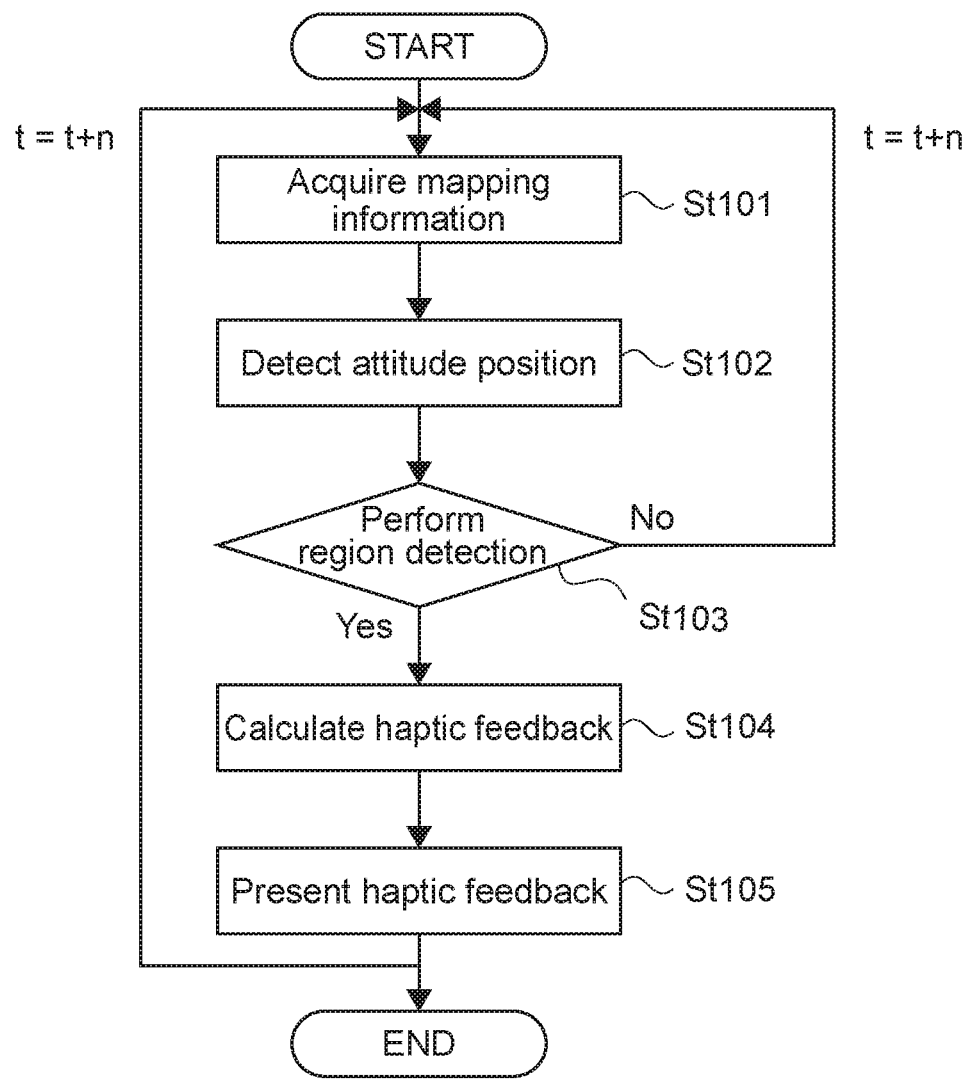
FIG. 7 A flowchart showing an operation of the haptic-feedback presenting apparatus.

An operation of the haptic-feedback presenting apparatus 100 will be described. FIG. 7 is a flowchart showing the operation of the haptic-feedback presenting apparatus 100.

As shown in FIG. 7, the haptic-feedback presenting apparatus 100 starts the operation thereof, and the mapping-information acquisition part 101 acquires the mapping information f(X,Y,Z)(t) (St101).

Subsequently, the position detection part 102 and the attitude detection part 103 detect the attitude position (x,y,z,θ)(t) of the haptic-feedback presenting apparatus 100 (St102).

Subsequently, the region detection part 104 performs region detection (St103). In the case that the mapping information included in the detection-target region R is the threshold or more (St103: Yes), the haptic-feedback arithmetic part 105 calculates the haptic feedback to be presented to the user (St104), and makes the haptic-feedback presenting part 106 present the haptic feedback (St105). In the case that the mapping information included in the detection-target region R is less than the threshold (St103: No), the haptic-feedback arithmetic part 105 determines no haptic feedback to be presented to the user.

The haptic-feedback arithmetic part 105 may calculate the haptic feedback depending on the size of the mapping information included in the detection-target region R. The haptic-feedback arithmetic part 105 may, for example, intensify the haptic feedback gradually in a case that the size of the mapping information included in the detection-target region R is larger as the detection-target region R moves, and may weaken the haptic feedback in a case that the size of the mapping information included in the detection-target region R is smaller as the detection-target region R moves.

The haptic-feedback presenting apparatus 100 repeats the processing at the time point (t+n) after n seconds from the time point (t). The haptic-feedback presenting apparatus 100 operates as described above.

Figure 8:
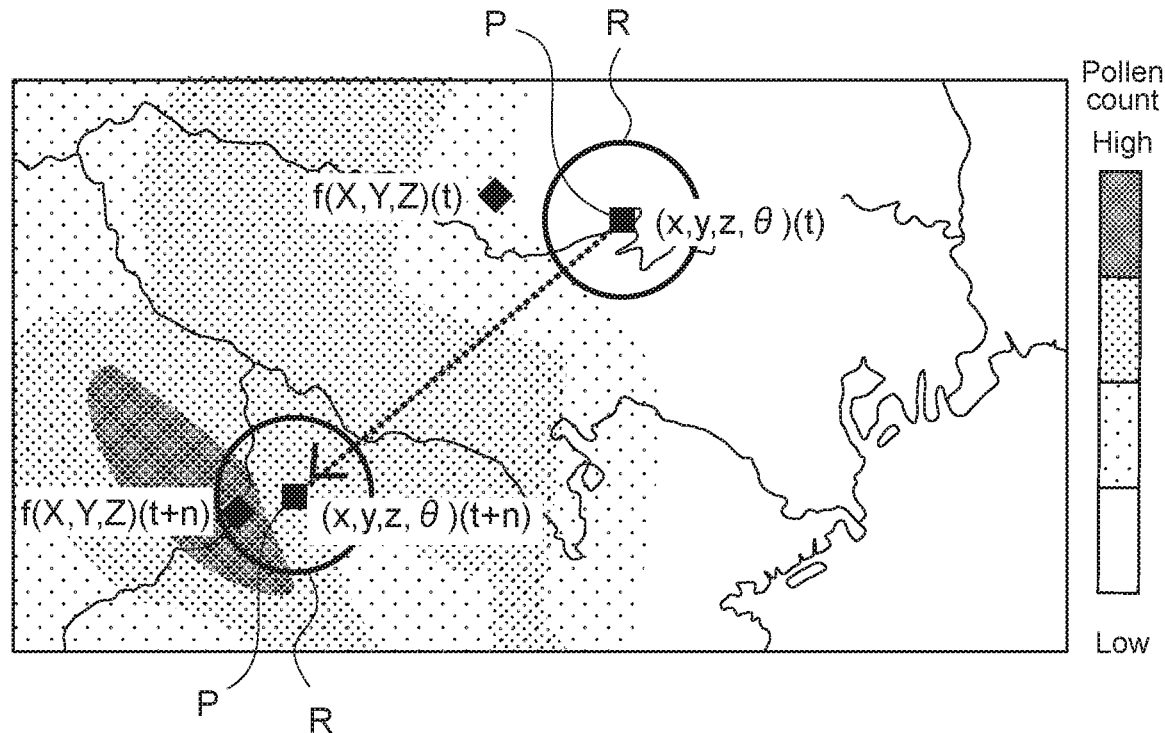
FIG. 8 A diagram schematically showing an operation of a haptic-feedback arithmetic part included in the haptic-feedback presenting apparatus.

FIG. 8 is a diagram schematically showing an operation example of the haptic-feedback presenting apparatus 100. As shown in FIG. 8, at the time point (t), the mapping information f (X,Y,Z) (t) is outside the detection-target region R, and the value thereof is small. As a result, the haptic-feedback arithmetic part 105 determines no haptic feedback to be presented.

At the time point (t+n), the user and the haptic-feedback presenting apparatus 100 move, and the mapping information f (X,Y,Z) (t+n) is inside the detection-target region R and more than the threshold. As a result, the haptic-feedback arithmetic part 105 calculates the haptic feedback, and the haptic-feedback presenting part 106 presents the haptic feedback.

Moreover, the mapping information is increased between the time point (t) and the time point (t+n), and the haptic-feedback arithmetic part 105 may intensify the haptic feedback gradually. Furthermore, the haptic-feedback arithmetic part 105 may also add the attitude (θ) of the haptic-feedback presenting apparatus 100 to haptic-feedback calculation. For example, the haptic-feedback arithmetic part 105 may present the haptic feedback that the user moves in a direction opposite to a moving direction of the user in a case that the mapping information is increased with respect to the moving direction of the user.

The haptic-feedback presenting apparatus 100 operates as described above. As described above, the mapping information is presented to the user by the haptic feedback, and as a result, the user may grasp the mapping information without vision and audition.

Note that, as described above, attitude detection by the attitude detection part 103 may be performed at the same time as position detection. Alternatively, after it is determined that the mapping information included in the detection-target region R is the threshold or more (St103: Yes), the attitude detection by the attitude detection part 103 may be performed before the haptic-feedback calculation (St104).

About Navigation

Figure 9:
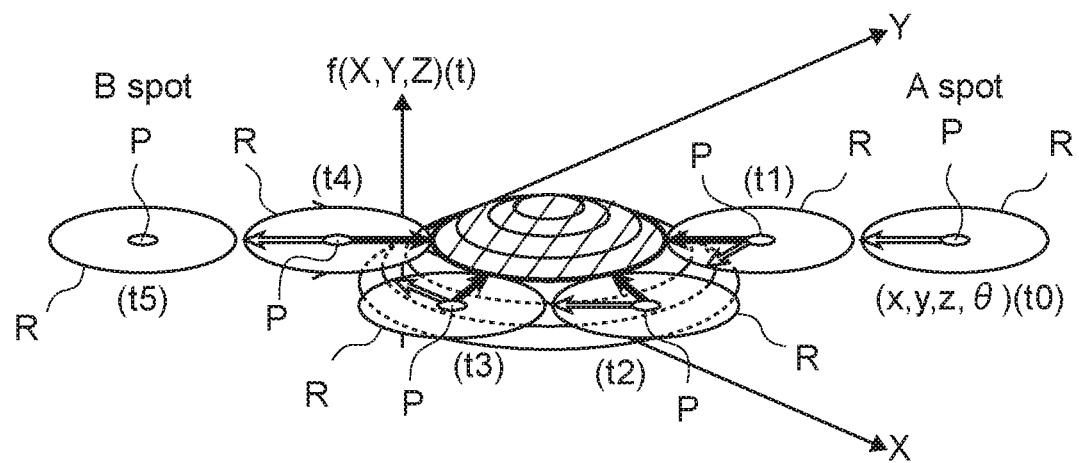
FIG. 9 A diagram schematically showing an operation of the haptic-feedback arithmetic part included in the haptic-feedback presenting apparatus.

FIG. 9 is a diagram schematically showing an example of navigation by haptic-feedback presentation. It is assumed that the navigation from the A spot to the B spot is performed such that it is avoided that the mapping information in the detection-target region R is the threshold or more (f(X,Y,Z)(t)≥0), in a case that the mapping information on the position (X,Y,Z) at the time point (t) is the f (X,Y,Z) (t), and the attitude position of the haptic-feedback presenting apparatus 100 at the time point (t) is the (x,y,z,θ)(t).

In FIG. 9, the black arrows show directions in which the mapping information is the threshold or more with respect to the haptic-feedback presenting apparatus 100, and the white arrows show directions (navigation directions) of the haptic feedback presented by the haptic-feedback presenting part 106.

At the time point (t0), the mapping information in the detection-target region R is less than the threshold, and the direction (white arrow) from the A spot to the B spot is calculated by the haptic-feedback arithmetic part 105.

At the time point (t1), the mapping information in the detection-target region R is the threshold or more, and the direction (white arrow) in which it is avoided that the mapping information is the threshold or more is calculated by the haptic-feedback arithmetic part 105. The direction (white arrow) in which it is avoided that the mapping information is the threshold or more is, for example, a direction different from the direction (black arrow) in which the mapping information is the threshold or more by a predetermined angle or more.

Similarly at the time point (t2) to the time point (t4), adding information of the B spot that is a destination, the directions (white arrows) in which it is avoided that the mapping information is the threshold or more are calculated by the haptic-feedback arithmetic part 105. In this manner, at the time point (t5), the haptic-feedback presenting apparatus 100 and the user reach the B spot. Although there is a region in which the mapping information is the threshold or more between the A spot and the B spot, it is possible that the user is guided avoiding the region.

About Plurality of Types of Mapping Information

Figure 10:
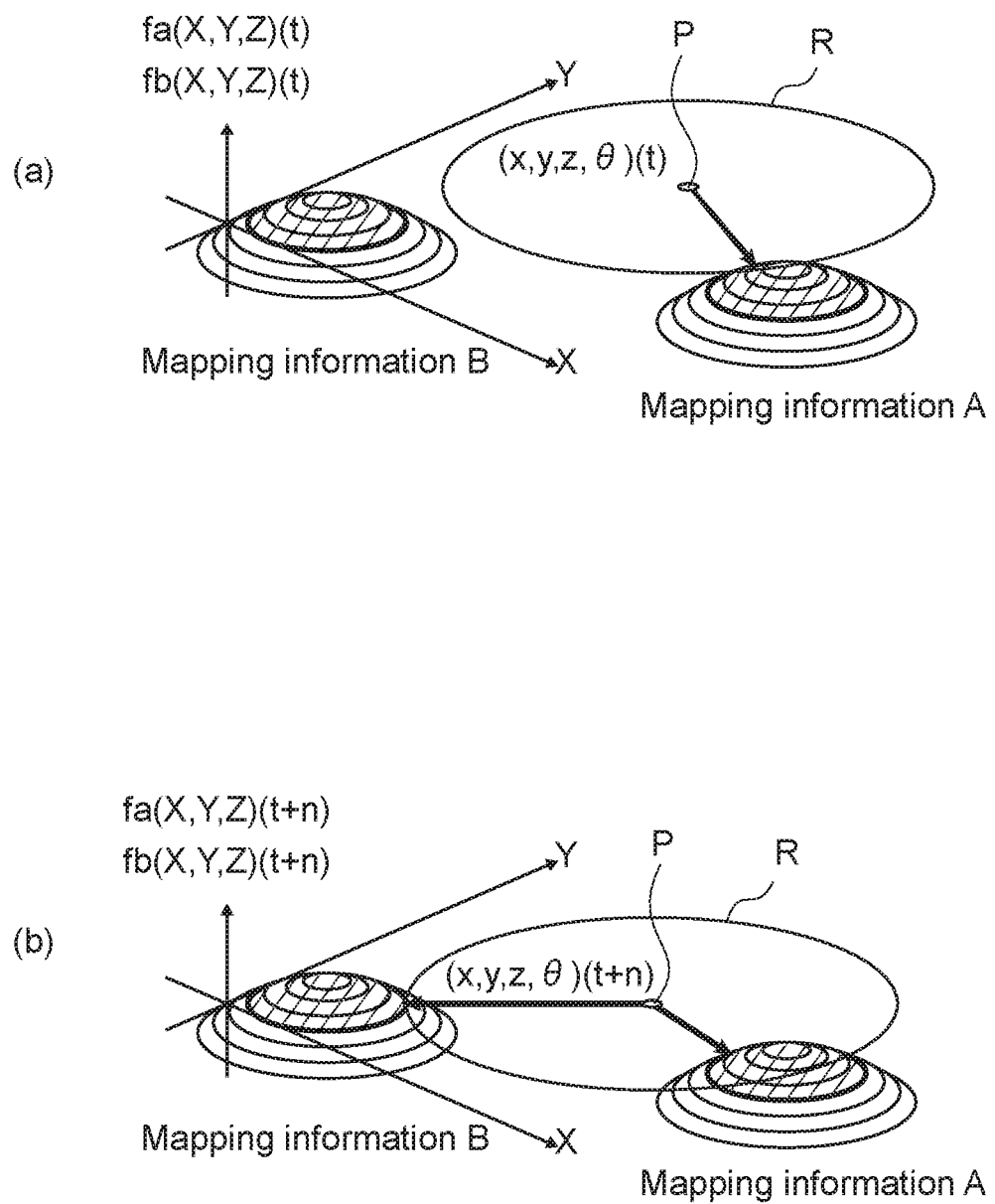
FIG. 10 A diagram schematically showing an operation of the haptic-feedback arithmetic part included in the haptic-feedback presenting apparatus.

The haptic-feedback presenting apparatus 100 is capable of supporting the plurality of types of mapping information. FIG. 10 is a diagram schematically showing the two types of mapping information and the detection-target region R. The mapping information A is, for example, an ultraviolet-ray amount, and the mapping information B is, for example, a scattered pollen count.

As shown in FIG. 10(a), at the time point (t), the mapping information A in the detection-target region R is the threshold or more (fa (X,Y,Z) (t)≥0), and the haptic-feedback presentation by the haptic-feedback presenting part 106 is performed.

After that, the haptic-feedback presenting apparatus 100 moves, and as shown in FIG. 10(b), at the time point (t+n), the mapping information B in the detection-target region R is the threshold or more (fb (X,Y,Z) (t+n)≥0). As a result, the haptic feedback presentation by the haptic-feedback presenting part 106 is performed.

The haptic-feedback arithmetic part 105 may calculate the different haptic feedbacks with respect to the mapping information A and the mapping information B respectively, and may make the haptic-feedback presenting part 106 present the different haptic feedbacks. The different haptic feedbacks are, for example, a haptic feedback having a low frequency with respect to the mapping information A, and a haptic feedback having a high frequency with respect to the mapping information B. Due to this, the user may grasp the type of the mapping information by a type of the haptic feedback.

For example, in a case that the mapping information A is the ultraviolet-ray amount, and the mapping information B is the scattered pollen count, the user may recognize that the ultraviolet-ray amount is the threshold or more by the presented haptic feedback having the low frequency. After that, the user may recognize that the scattered pollen count is also the threshold or more by the presented haptic feedback having the high frequency. Note that the number of the types of the mapping information is not limited to two, and may be three or more.

Method of Detecting Mapping Information

As described above, the mapping-information acquisition part 101 may acquire the mapping information from cloud information and an output from a sensor. As various methods of detecting the mapping information, an radio wave intensity as an example of the density of an environment may be measured by a measurement method in which an electromagnetic field is used, and an scattered pollen count and a scattered dust count as examples of the density of an environment may be measured by a measurement method in which a scattered light intensity and a degree of polarization are used.

Moreover, precipitation may be measured by a measurement method in which capacitance is detected, and photocoupler penetration is used, and radiation dose may be measured by a Geiger-Mueller counter, a scintillation counter, or a PIN photodiode. Quantity of airflow may be measured by a measurement method in which an airflow meter is used.

Congestion in a train and a running position as examples of the density of a thing may be acquired from official information from each railway company, a user submission, or the like. Crowding of human, a place, and the like as examples of the density of human may be acquired from a user submission, a submission limited to a particular user by ID registration, or the like.

Exaltation and a calm as examples of the density of a feeling may be detected by sensing a human body state by using an electroencephalogram, cooperation with a wearable heart rate, or the like.

The mapping information is not limited to the information described above, and may be information related to a particular position in space or on a plane. Moreover, the mapping-information acquisition part 101 may generate the mapping information depending on appointment by the user or the like.

Hardware Configuration

Figure 11:
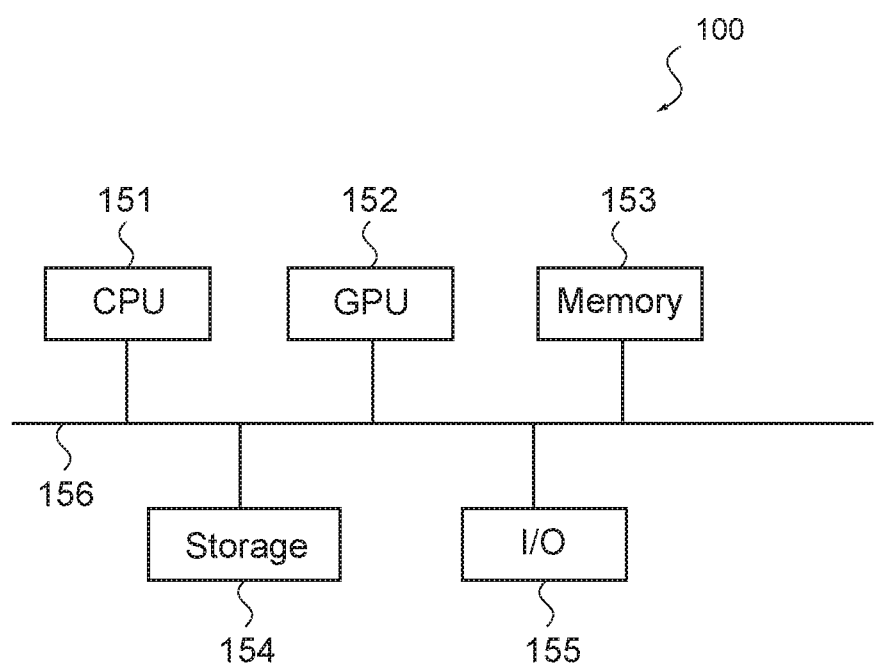
FIG. 11 A block diagram showing a hardware configuration of the haptic-feedback presenting apparatus.

FIG. 11 is a diagram schematically showing a hardware configuration of the haptic-feedback presenting apparatus 100. As shown in FIG. 11, the haptic-feedback presenting apparatus 100 includes a CPU 151, a GPU 152, a memory 153, a storage 154, and an input/output part (I/O) 155 as the hardware configuration. These are connected to each other by a bus 156.

The CPU (Central Processing Unit) 151 controls the other configuration according to a program stored in the memory 153, performs data processing according to the program, and stores a processing result in the memory 153. The CPU 151 may be a microprocessor.

The GPU (Graphic Processing Unit) 152 is controlled by the CPU 151, and executes image processing. The CPU 151 is capable of causing the GPU 152 to execute parallel arithmetic processing and perform a characteristic amount of extraction at high speed. The GPU 152 may be a microprocessor.

The memory 153 stores a program and data executed by the CPU 151. The memory 153 may be an RAM (Random Access Memory).

The storage 154 stores a program and data. The storage 154 may be an HDD (hard disk drive) or an SSD (solid state drive).

The input/output part 155 receives an input to the haptic-feedback presenting apparatus 100, and supplies an output from the haptic-feedback presenting apparatus 100 externally. The input/output part 155 includes an input apparatus such as a keyboard or a mouse, an output apparatus such as a display, and a connection interface such as a network.

Moreover, hardware such as a GPS module, an acceleration sensor, and a geomagnetic sensor that realizes the functional configuration of the haptic-feedback presenting apparatus 100 described above and is not shown is connected to the input/output part 155.

The hardware configuration of the haptic-feedback presenting apparatus 100 is not limited to the configuration described above, and may be a configuration in which the functional configuration of the haptic-feedback presenting apparatus 100 may be realized. Moreover, a part or all of the hardware configuration may exist in a network.

Haptic-feedback Presenting System

The functional configuration of the haptic-feedback presenting apparatus 100 described above may be realized by a haptic-feedback presenting system including a plurality of apparatuses that are connected to each other. For example, the functional configuration of the haptic-feedback presenting apparatus 100 described above may be realized by the haptic-feedback presenting system including a haptic-feedback presenting apparatus that includes the position detection part 102, the attitude detection part 103, and the haptic-feedback presenting part 106, and an information processing apparatus that includes the mapping-information acquisition part 101, the region detection part 104, and the haptic-feedback arithmetic part 105.

Note that the present technology may also employ the following configurations.

(1)
A haptic-feedback presenting apparatus, including:
a mapping-information acquisition part acquiring mapping information that is information mapped in space;
a region detection part setting a detection-target region and determining whether or not the mapping information included in the detection-target region is a threshold or more; and
a haptic-feedback arithmetic part calculating a haptic feedback to be presented to a user on the basis of a determination result from the region detection part.

(2)
The haptic-feedback presenting apparatus according to (1), in which
the haptic-feedback arithmetic part presents the haptic feedback to the user in a case that the mapping information included in the detection-target region is the threshold or more, and presents no haptic feedback to the user in a case that the mapping information included in the detection-target region is less than the threshold.

(3)
The haptic-feedback presenting apparatus according to (2), in which
the haptic-feedback arithmetic part calculates the haptic feedback to be presented to the user depending on a difference between the mapping information that is included in the detection-target region and is the threshold or more, and the threshold.

(4)
The haptic-feedback presenting apparatus according to any one of (1) to (3), further including
a position detection part detecting a position of the haptic-feedback presenting apparatus, in which
the haptic-feedback arithmetic part determines a predetermined region, a center of which is the position of the haptic-feedback presenting apparatus, as the detection-target region.

(5)
The haptic-feedback presenting apparatus according to (4), further including
an attitude detection part detecting an attitude of the haptic-feedback presenting apparatus, in which
the haptic-feedback arithmetic part calculates the haptic feedback to be presented to the user on the basis of the mapping information that is included in the detection-target region and is the threshold or more, and the attitude of the haptic-feedback presenting apparatus.

(6)
The haptic-feedback presenting apparatus according to (5), further including
a haptic-feedback presenting part producing an oscillation that causes the user to feel that the haptic-feedback presenting apparatus is pulled in a predetermined direction, in which
the haptic-feedback arithmetic part determines the predetermined direction on the basis of a direction of the mapping information with respect to the haptic-feedback presenting apparatus and the attitude of the haptic-feedback presenting apparatus in a case that the mapping information included in the detection-target region is the threshold or more.

(7)
The haptic-feedback presenting apparatus according to (6), in which
the haptic-feedback arithmetic part determines the direction of the mapping information with respect to the haptic-feedback presenting apparatus as the predetermined direction.

(8)
The haptic-feedback presenting apparatus according to (6), in which
the haptic-feedback arithmetic part determines a direction in which the mapping information included in the detection-target region is less than the threshold as the predetermined direction.

(9)
The haptic-feedback presenting apparatus according to any one of (1) to (8), in which
the mapping information includes first mapping information and second mapping information, and
the haptic-feedback arithmetic part calculates a first haptic feedback as the haptic feedback to be presented to the user in a case that the first mapping information included in the detection-target region is the threshold or more, and calculates a second haptic feedback as the haptic feedback to be presented to the user in a case that the second mapping information included in the detection-target region is the threshold or more.

(10)
A haptic-feedback presenting system, including:
a mapping-information acquisition part acquiring mapping information that is information mapped in space;
a region detection part setting a detection-target region and determining whether or not the mapping information included in the detection-target region is a threshold or more; and
a haptic-feedback arithmetic part calculating a haptic feedback to be presented to a user on the basis of a determination result from the region detection part.

(11)
A haptic-feedback presenting method, in which
a mapping-information acquisition part acquires mapping information that is information mapped in space,
a region detection part sets a detection-target region and determines whether or not the mapping information included in the detection-target region is a threshold or more, and
a haptic-feedback arithmetic part calculates a haptic feedback to be presented to a user on the basis of a determination result from the region detection part.

REFERENCE SIGNS LIST

100 information processing apparatus
101 mapping-information acquisition part
102 position detection part
103 attitude detection part
104 region detection part
105 haptic-feedback arithmetic part
106 haptic-feedback presenting part It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:
1. A haptic-feedback presenting system, comprising:
a mapping-information acquisition part acquiring mapping information in space;

a position detection part detecting a position of a user;
a region detection part setting a detection-target region and determining whether or not the mapping information included in the detection-target region satisfies a condition that is appointed by the user or a predetermined range;
a haptic-feedback arithmetic part calculating a haptic feedback to be presented to the user on a basis of a determination result from the region detection part; and
a haptic-feedback presenting part presenting the haptic feedback to the user in a first direction, wherein
the haptic-feedback arithmetic part determines the first direction different from a direction towards the mapping information with respect to the user in a case that the mapping information included in the detection-target region satisfies the condition.

2. The haptic-feedback presenting apparatus according to claim 1, wherein
the haptic-feedback arithmetic part presents the haptic feedback to the user in a case that the mapping information included in the detection-target region is a threshold or more, and presents no haptic feedback to the user in a case that the mapping information included in the detection-target region is less than the threshold.

3. The haptic-feedback presenting apparatus according to claim 2, wherein
the haptic-feedback arithmetic part calculates the haptic feedback to be presented to the user depending on a difference between the mapping information that is included in the detection-target region and is the threshold or more, and the threshold.

4. The haptic-feedback presenting apparatus according to claim 1, wherein
the haptic-feedback arithmetic part determines a predetermined region, a center of which is the position of the user, as the detection-target region.

5. The haptic-feedback presenting apparatus according to claim 1, further comprising
an attitude detection part detecting an attitude of the haptic-feedback presenting apparatus, wherein the haptic-feedback arithmetic part calculates the haptic feedback to be presented to the user on a basis of the mapping information that is included in the detection-target region and is in the predetermined range.

6. The haptic-feedback presenting apparatus according to claim 1, wherein
the haptic feedback is an oscillation that causes the user to feel that the haptic-feedback presenting apparatus is pulled in the first direction.

7. The haptic-feedback presenting apparatus according to claim 1, wherein
the mapping information includes first mapping information and second mapping information, and
the haptic-feedback arithmetic part calculates a first haptic feedback as the haptic feedback to be presented to the user in a case that the first mapping information included in the detection-target region is a threshold or more, and calculates a second haptic feedback as the haptic feedback to be presented to the user in a case that the second mapping information included in the detection-target region is the threshold or more.

8. The haptic-feedback presenting apparatus according to claim 1, wherein
the detection-target region satisfies the condition that is appointed by the user.

9. The haptic-feedback presenting apparatus according to claim 1, wherein
the detection-target region satisfies the predetermined range.

10. A haptic-feedback presenting method, comprising:
acquiring mapping information in space;
detecting a position of a user;
setting a detection-target region and determining whether or not the mapping information included in the detection-target region satisfies a condition that is appointed by the user or a predetermined range;
calculating a haptic feedback to be presented to the user on a basis of a determination result from the region detection part; and
presenting the haptic feedback to the user in a first direction, wherein
the first direction different from a direction towards the mapping information with respect to the user in a case that the mapping information included in the detection-target region satisfies the condition.

11. The haptic-feedback presenting method according to claim 10, further comprising
presenting the haptic feedback to the user in a case that the mapping information included in the detection-target region is a threshold or more, and presenting no haptic feedback to the user in a case that the mapping information included in the detection-target region is less than the threshold.

12. The haptic-feedback presenting method according to claim 11, further comprising
calculating the haptic feedback to be presented to the user depending on a difference between the mapping information that is included in the detection-target region and is the threshold or more, and the threshold.

13. The haptic-feedback presenting method according to claim 10, further comprising
determining a predetermined region, a center of which is the position of the user, as the detection-target region.

14. The haptic-feedback presenting method according to claim 10, further comprising
detecting an attitude of the haptic-feedback presenting apparatus; and
calculating the haptic feedback to be presented to the user on a basis of the mapping information that is included in the detection-target region and is in the predetermined range.

15. The haptic-feedback presenting method according to claim 10, wherein
the haptic feedback is an oscillation that causes the user to feel that the haptic-feedback presenting apparatus is pulled in the first direction.

16. The haptic-feedback presenting method according to claim 10, wherein
the mapping information includes first mapping information and second mapping information, and further comprising
calculating a first haptic feedback as the haptic feedback to be presented to the user in a case that the first mapping information included in the detection-target region is a threshold or more, and calculating a second haptic feedback as the haptic feedback to be presented to the user in a case that the second mapping information included in the detection-target region is the threshold or more.

* * * * *